United States Patent [19]
Huppertz et al.

[11] Patent Number: 5,754,383
[45] Date of Patent: May 19, 1998

[54] FAULTED CIRCUIT INDICATIOR WITH VARIABLE LOAD LEVELLING CIRCUIT

[75] Inventors: Werner Huppertz, Essen; Hendrik Horstmann, Ratingen, both of Germany

[73] Assignee: Dipl.-Ing H. Horstmann GmbH, Germany

[21] Appl. No.: 517,734

[22] Filed: Aug. 21, 1995

[30] Foreign Application Priority Data

Jun. 3, 1995 [DE] Germany .................. 195 07 772.5

[51] Int. Cl.$^6$ ........................................ H02H 3/00
[52] U.S. Cl. ............................... 361/93; 361/115
[58] Field of Search ................... 361/94, 93, 92, 361/59, 115

[56] References Cited

U.S. PATENT DOCUMENTS 5,168,414  12/1992  Horstman .................. 361/92
5,241,444  8/1993  Yeh ............................ 361/93

*Primary Examiner*—Jeffrey A. Gaffin
*Assistant Examiner*—Stephen Jackson
*Attorney, Agent, or Firm*—Davis Chin

[57] ABSTRACT

A faulted circuit indicator includes a variable load levelling circuit which can automatically adjust itself to a peak current in order to accommodate a relatively wide range of load currents. The variable load levelling circuit is operatively connected to a current sensing circuit and is responsive to a varying load current flowing through the cable for regulating a variable output voltage therefrom to be at a constant reference value. As a result, the need to store in inventory large quantities of fault indicators with different rated currents has been substantially reduced.

14 Claims, 4 Drawing Sheets

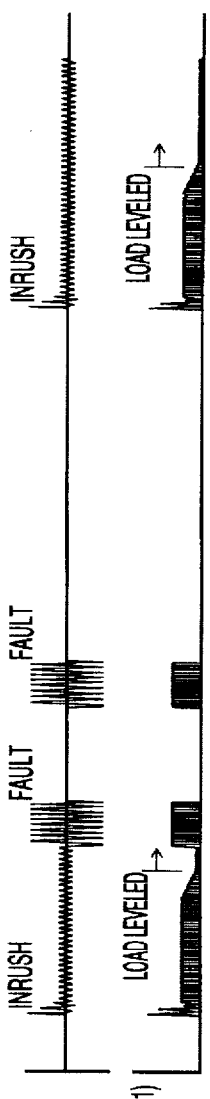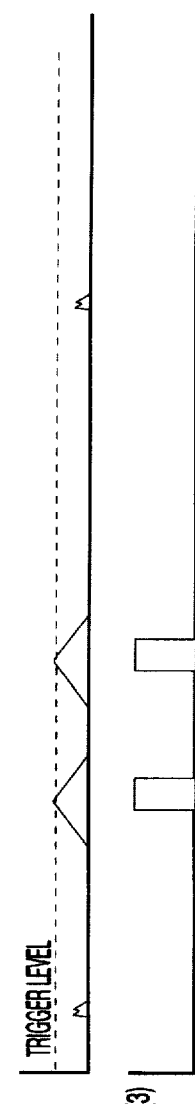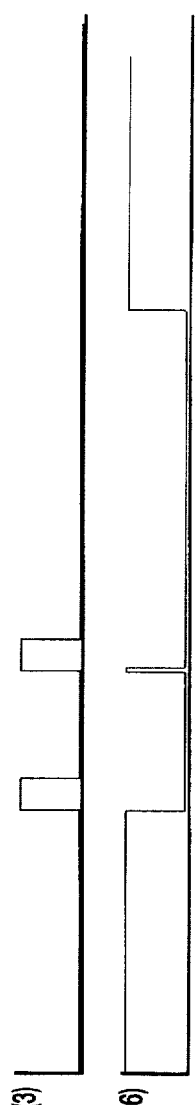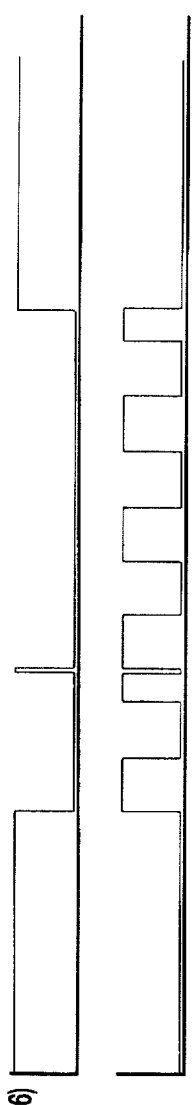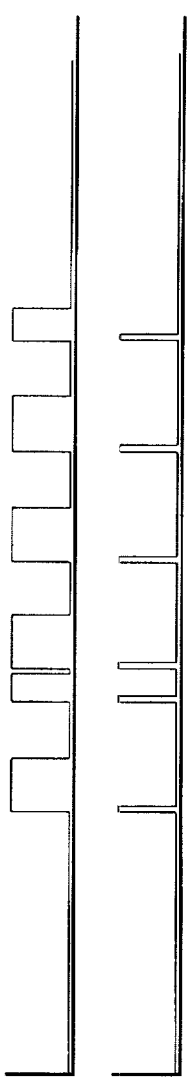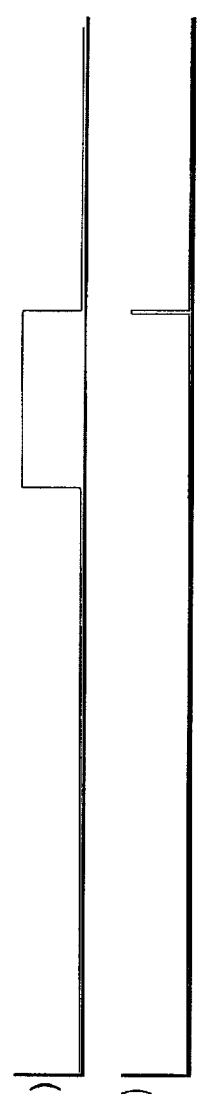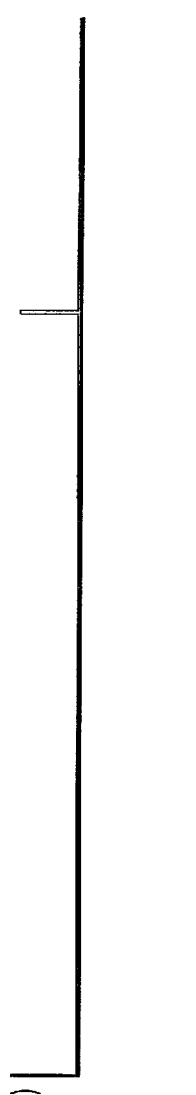

FUNCTION PLOT OF LOAD LEVELING

Fig. 5a LOAD CURRENT

Fig. 5b OUTPUT VOLTAGE OF CURR. TRANSFORMER PICKUP(1) LOAD LEVELED BY LOAD LEVELING (2)

Fig. 5c VOLTAGE OVER C2 IN TIME CURRENT TRIGGER (3)

Fig. 5d OUTPUT VOLTAGE OF TIME CURRENT TRIGGER(3) SET OF BI-STABLE FLIP FLOP(5)

Fig. 5e INPUT VOLTAGE OF COUNTER/OSCILLATOR(6) RESET OF COUNTER

Fig. 5f OUTPUT VOLTAGE QC OF COUNTER OSCILLATOR(6)

Fig. 5g CURRENT THROUGH D2 IN LED DRIVER(7)

Fig. 5h CURRENT RESET WINDOW(11)

Fig. 5i OUTPUT VOLTAGE OF RESET CURRENT AMPLIFIER(9) RESET OF BI-STABLE FLIP-FLOP(5)

1

FAULTED CIRCUIT INDICATIOR WITH VARIABLE LOAD LEVELLING CIRCUIT

BACKGROUND OF THE INVENTION

1. Field of the Invention

This invention relates generally to faulted circuit indicators and more particularly, it relates to an improved faulted circuit indicator which includes a variable load levelling circuit so as to be capable of accommodating a relatively wide range of load currents.

2. Description of the Prior Art

As is generally known in the art, faulted circuit indicators are provided in power distribution circuits to indicate that a power cable current above a predetermined magnitude, i.e., a trip current, has been exceeded. This trip current magnitude is generally selected to be approximately two or three times the maximum load current to be expected in the power distribution circuit, but less than the value of a fault current. Conventional fault indicators are provided with typical rated values of 1,000 amps, 800 amps, 600 amps, and 400 amps. However, there is a disadvantage when applying these conventional fault indicators in a large power distribution network. This is because there is often required the use of many fault indicators with different rated trip currents to cooperate with the varying loads within the network.

Also, another disadvantage is that it is possible to have a circuit already installed with a fault indicator of a particular rated trip current be required to be changed to a different value due to the load variations. As a result, it will be necessary to replace or readjust the fault indicator to the new rated value. There is the disadvantage of cost in carrying and storing in inventory the many fault indicators with different rated currents.

For example, such a conventional faulted circuit indicator is illustrated and described in U.S. Pat. No. 5,168,414 to H. Horstmann, which is assigned to the same assignee as the present invention and is hereby incorporated by reference in its entirety. The faulted circuit indicator includes a current transducer, an overcurrent detector, a low current amplifier, and an indicator unit. The current transducer or sensor is provided on the input side which is positioned over the conductor to be monitored, i.e. overhead line, power cable or busbar. The secondary coil of the current transducer is connected to an overcurrent detector. This has a rectifier circuit which supplies a DC voltage proportional to the current. A voltage divider consisting of resistor and potentiometer serves for adjustment of the actuation threshold. The voltage divider is followed by an operational amplifier, which becomes conductive when the set overcurrent value is exceeded.

The output from the overcurrent detector controls a memory flip-flop. Its output signal starts an electronic counter. A NAND gate in back of the counter can send a reset pulse to the memory flip-flop after a certain period of time has expired. The memory flip-flop can be reset even when the high current value is still present. In this manner, it is always possible to differentiate between overcurrents and transient peak values such as can occur from non-fault switching transients.

The output Q of the memory flip-flop controls a low current amplifier for small currents. Normally, output Q of the memory flip-flop is at logic "0" or zero volts so that the amplifier is disabled or switched off. The output of the amplifier for small currents is connected to the input of a digital pass-band filter consisting of two mono-stable multivibrators. Each of their opening or dwell times is determined by the preceding RC network. The output of the first monoflop is connected to the input of the second monoflop.

The output of the pass-band filter is connected to an integrator which provides a reset signal for the memory flip-flop. The amplifier for small currents serves for amplifying the reference voltage formed in the current transducer and feeding this value to the filter unit, which allows primarily frequencies closely above and below to the line frequency, i.e. 50 or 60 Hz to pass.

The indicator unit shows when a true fault has been located and the protective device assigned to the line has tripped. The visible signalling device consists of a light-emitting diode. In the normal state of the conductor or line, i.e. when normal current loads are present, the overcurrent detector as well as the amplifier for small currents are non-conductive. All further components, i.e. the memory flip-flop, counter, shift register, filter, integrator and indicator unit are in the non-actuated state. This means that the unit requires only an extremely small idling current. It is preferable to use a long-life lithium battery for the power supply.

When an overcurrent with a value multiple to that of the normal current occurs, the above described faulted circuit indicator will begin its operation. The faulted circuit indicator senses the excessive current over a certain period of time and stores this signal in the shift register. Then, the data from the amplifier for small currents is evaluated for the same period of time. If, after the detection of high current followed by a waiting period, a phase is present with a current less than 0.3 A, this proves that a real short circuit was present, i.e. that the fuse or line protective device has tripped. In this case the indicator unit is switched on. The light-emitting diode flashes for an adjustable period of time which may last up to several hours, until it is switched off by the counter. Resetting is also possible when the normal current load returns or can be done manually by triggering a reed contact.

On the other hand a power surge caused by lightning, transformer magnetizing inrush current, etc., which did not trip the protection unit, will not switch on the indicator unit. The described faulted circuit indicator can be equipped with a terminal strip for practical applications so that it can be adjusted at the factory to the desired nominal value using a wire jumper.

Accordingly, there has arisen a continued need in the power distribution industry for a faulted circuit indicator which can automatically adjust itself to a peak load in order to accommodate a relatively wide range of load currents, thereby reducing the need to store in inventory large quantities of faulted circuit indicators with different rated currents.

The faulted circuit indicator of the present invention represents a significant improvement over the prior art described above in the '414 patent. The faulted circuit indicator of the present invention includes a variable load levelling circuit which is connected in parallel to the current sensing circuit for regulating the variable output voltage therefrom to be at a constant reference value. In this manner, the faulted circuit indicator of the present invention is automatically adjusted to different peak loads in order to accommodate a relatively wide range of load currents.

SUMMARY OF THE INVENTION

Accordingly, it is a general object of the present invention to provide an improved faulted circuit indicator which is relatively simple and economical to manufacture and assemble, but yet overcomes the disadvantages of the prior art fault indicators.

It is an object of the present invention to provide a faulted circuit indicator which can automatically adjust itself to an average load.

It is another object of the present invention to provide a faulted circuit indicator which accommodates a relatively wide range of load currents, thereby reducing inventory problems.

It is still another object of the present invention to provide a faulted circuit indicator which includes a variable load levelling circuit to regulate a variable output voltage to be at a constant reference value.

In accordance with these aims and objectives, the present invention is concerned with the provision of a faulted circuit indicator for sensing and registering a fault in response to an overcurrent in a cable in a power distribution network. The faulted circuit indicator includes a current sensing circuit for monitoring a varying load current flowing through the cable and for generating a variable output voltage which is proportional to the varied load current flowing through the cable. An overcurrent detector circuit is responsive to the current sensing circuit for detecting an overcurrent condition. There is provided a control circuit which is responsive to the current sensing circuit and to the overcurrent detector circuit for evaluating the current flowing into cable during a predetermined time interval subsequent to the time when the overcurrent condition is detected.

A display unit is provided which is responsive to the control circuit for generating a fault registration only when the current evaluated during the predetermined time interval has an amplitude below a pre-selected level so as to indicate that an actual fault has occurred as a result of the overcurrent condition rather than a transient event. A variable load levelling circuit is operatively connected to the current sensing circuit and is responsive to the varied load current for regulating the variable output voltage therefrom to be at a constant reference value and for storing a value of the variable output voltage corresponding to a previous load current so as to automatically adjust to different peak loads in order to accommodate a relatively wide range of load currents.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 5 shows waveforms at various points in the circuit of FIG. 2, useful in understanding the operation of the present invention.

DESCRIPTION OF THE PREFERRED EMBODIMENTS

Figure 1:
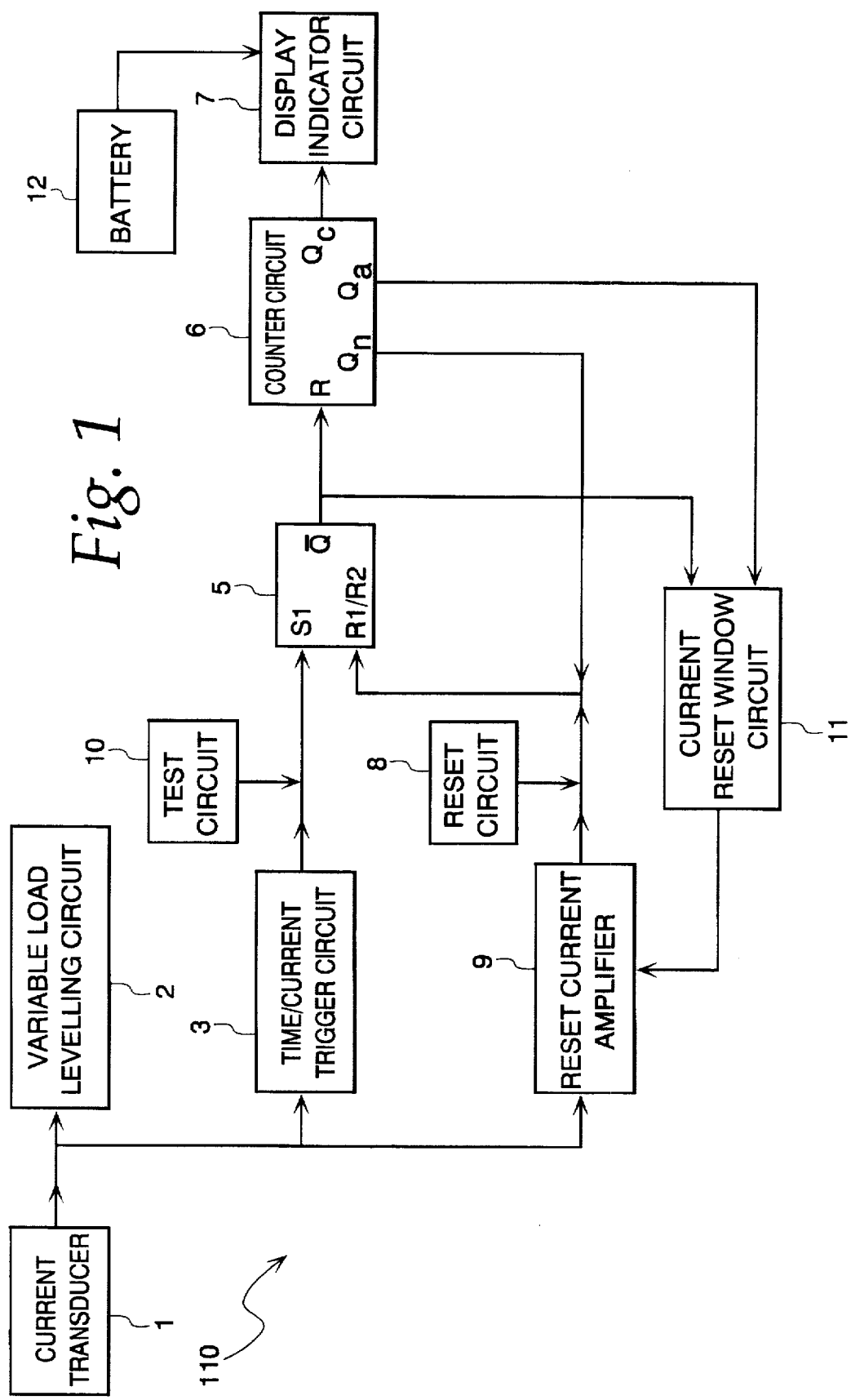
FIG. 1 is a block diagram of a faulted circuit indicator, constructed in accordance with the principles of the present invention.

Referring now to the drawings, there is illustrated in FIG. 1 a block diagram of an improved faulted circuit indicator 110 which is constructed in accordance with the principles of the present invention. The faulted circuit indicator 110 functions to sense and to register a fault in response to an overcurrent in a line conductor or cable (not shown) in an A.C. power distribution network and is capable of adjusting automatically the trip to the load current in order to accommodate a relatively wide range of load conditions. The fault circuit indicator 110 is comprised of a current transducer or sensor 1, a variable load levelling circuit 2, a time/current trigger circuit 3, a flip-flop circuit 5, an oscillator-driven counter circuit 6, a display indicator circuit 7, a reset current amplifier circuit 9, and a current reset window circuit 11.

The current sensor 1 is formed of a current transformer L1 which is coupled magnetically to the conductor for producing an alternating voltage corresponding in amplitude to the amplitude of the alternating current it senses in the cable. The current sensor 1 also includes a bridge rectifier BG1 which rectifies the sensed alternating voltage to produce a direct current waveform proportional to the current flowing in the cable. The output of the current sensor 1 is fed to the variable load levelling circuit 2, whose resistance changes in relation to the current flowing in the cable with a time delay to form an average value.

Figures 2, 4:
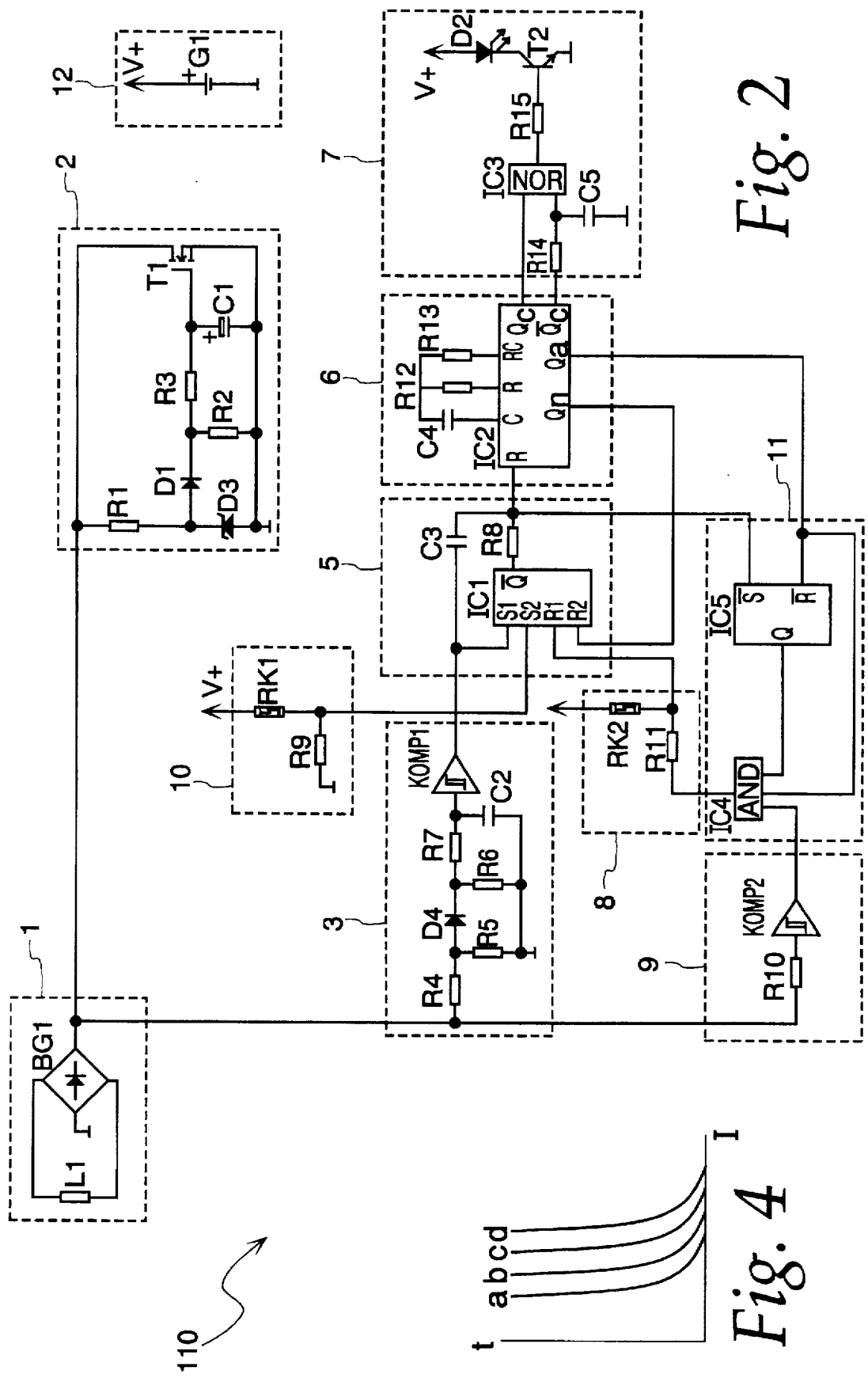
FIG. 2 is a detailed schematic circuit diagram of the faulted circuit indicator of FIG. 1.
FIG. 4 shows a number of time/current operational curves for use in the trigger circuit 3 of FIG. 2.

The output of the bridge rectifier defining a reference voltage is fed to the time/current trigger circuit 3, which trips when the measured voltage increases highly and rapidly. The variable operational or actuation curves for use in the trigger circuit 3 are illustrated in FIG. 4. Only the left-most curve a would apply in the absence of the variable load levelling circuit 2. This curve a indicates that the actuation time is decreased as the magnitude of the overcurrent is increased. Curve a illustrates the smallest current range, e.g. 10 A. At higher basic loads, the resistance of variable load 2 becomes so low that the trigger circuit trips only at a short circuit current corresponding to curve b. At even higher basic loads, curves c, d, etc. apply.

The output signal from trigger circuit 3 is fed to the set input S1 of bistable flip-flop circuit 5. This flip-flop circuit 5 is followed by the oscillator-driven counter circuit 6, which also controls the display indicator circuit 7. A reset circuit 8 allows a reset pulse to be given manually by triggering a reed contact RK2 with a permanent magnet to reset input R1 of the bistable flip-flop circuit 5. This switches off the display indicator circuit 7 via counter 6.

The input of a reset current amplifier 9 is connected to the output of the current sensor 1. This amplifier determines whether the current in the conductor has decreased to nearly zero after actuation of the time/current trigger circuit. If not, i.e., if the circuit breaker has not switched off, the reset current amplifier 9 sends a signal in a current reset window circuit 11, to which other signals from the bistable flip-flop and counter are added. The current reset window circuit 11 is activated for only a few seconds by the oscillator-driven counter circuit 6 to prevent the display indicator circuit 7 switched off by the short circuit from resetting uncontrolled when the line power returns or from interfering adjacent fields. The display indicator circuit 7 is supplied with power by a long-life battery 12, which is preferably a lithium battery.

Normally, the display indicator circuit is reset by the counter circuit 6, sending a reset pulse via its output Qn after expiration of a pre-set time (for example, after several hours). This reset pulse is fed to the reset input R2 of the bistable flip-flop 5. However, the display indicator circuit 7 can also be reset via the reset current amplifier 9 when the power returns. A test circuit 10 allows the display indicator circuit 7 to be excited manually by a reed contact RK1 to perform the usual operating steps up to manual reset or reset via the reset circuit 8 or by the flow of current after expiration of the time.

The detailed schematic circuit diagram in FIG. 2 shows the block 1–12 consisting of components, amplifier and other integrated circuits. The primary element of current sensor 1 is coil L1, which is magnetically coupled to the power conductor to be monitored. The AC voltage induced in coil L1 is proportional to the primary current with a frequency of preferably 50 or 60 Hz. This induced current is fed to bridge rectifier BG1. Its output voltage is defined as the reference voltage $U_M$.

Assuming that the lowest of all expected currents flows in the conductor to be monitored, i.e., approximately 10 A on the average, and that the current transducer is dimensioned so that the reference voltage $U_M$ present is less than the threshold value for the variable load 2, the time/current circuit 3 will be operating on the lowest threshold curve a of FIG. 4. The blocks 3, 5, 6 and 7 therefore remain in the non-actuated state.

If a sudden sharp rise in the current, e.g., a short circuit, occurs, the reference voltage $U_M$ will increase steeply. This voltage is applied to the voltage divider composed of resistors R4, R5 of the time/current trigger circuit 3. This is illustrated in FIGS. 5(a) and 5(b). Capacitor C2 is charged via diode O4 and resistor R7.

During the time between the peaks of successive half-waves of the reference voltage, the capacitor C2 is discharged slowly by the resistors R6 and R7. This is shown in FIG. 5(c). The switching threshold of comparator KOMP1 will be exceeded depending on the current amplitude and duration of the current pulse. The blocks are dimensioned so that the trip characteristics of the time/current trigger circuit 3 will follow the curve a of FIG. 4 corresponding to the protection curve for the line to the greatest extent. The positive edge of the non-inverted comparator KOMP1 activates the positive edge controlled set input S1 of the bistable flip-flop 5 so that the inverse output $\bar{Q}$ of the flip-flop is a logic "0" and counter 6 is started via resistor R8. This is depicted in FIGS. 5(d) and 5(e), respectively.

This start command at the output $\bar{Q}$ travels to the highly active reset input R of counter 6. The integrated circuit IC2 for counter 6, contains an oscillator with a reference frequency for control of all chronological sequences of the entire faulted circuit indicator. Resistors R12 and R13 and capacitor C4 form the external circuit for IC2. The complementary outputs Qc and $\bar{Q}c$ feed the indicator circuit 7, which has a pulse shaper stage in addition to the LED D2 and control transistor T2. This pulse shaper stage consists of a series resistor R14, a capacitor C5 and a NOR gate IC3. The pulse shaper stage generates an asymmetrical signal curve from the symmetrical pulses from the counter output. The output Qc and the current in the diode D2 are shown in respective FIGS. 5(f) and 5(g).

When output Qc is high, the complementary output $\bar{Q}c$ is low. The output of NOR gate IC3 is low due to the high level of output Qc. The second input of NOR gate IC3 continues to receive a high signal for the duration of the time constant formed by the RC circuit. At the cycle change for output Qc and $\bar{Q}c$, capacitor C5 is already completely discharged so that output Qc is low and output $\bar{Q}c$ is high. From now on until expiration of the time constant both inputs of the NOR gate IC3 are low and the output is high. If the voltage on capacitor C5 exceeds the threshold of the NOR gate input, its output goes back to low.

During the time when the NOR gate IC3 is at a high logic level, the output transistor T2 receives a limited base current via base resistor R15 so that the collector current through the LED D2 does not exceed a maximum value. During the time when the NOR gate IC3 is at a low logic level, the output transistor T2 is non-conductive.

When counter circuit 6 starts up, the bistable flip-flop IC5 of the reset window circuit 11 is set by the falling edge of the output $\bar{Q}$ of IC1 and the output Q of flip-flop IC5 goes to high, which is a first input to the AND gate IC4. As counter circuit 6 continues to count up, the output Qa is switched to high after a longer, set time, so that the second input of AND gate IC4 then goes to high.

If the reference voltage $U_M$, which corresponds to a defined, low current, then exceeds the defined threshold for the non-inverting comparator KOMP2, the third input of the AND gate IC4 switches between high and low in time with the half-waves of the reference signal. When the output of gate IC4 is high, the bistable flip-flop 5 is switched to the non-actuated state via its reset input R1, the counter circuit 6 is then stopped and the display indicator circuit 7 will be switched off. The entire faulted circuit indicator is then reset to monitoring status.

On the other hand, if the reference voltage $U_M$ is less than the threshold or trigger level of the comparator KOMP2, the counter circuit 6 continues to count up so that after a few seconds the output Qa as well as the second input of the AND gate IC4 are switched to a low level. The negative edge of the output Qa resets the bistable flip-flop IC5. Output Q of flip-flop IC5 is switched to high for a few seconds only once after activation. This time is designated as the reset window. During this time the faulted circuit indicator can be reset by the operating current derived from reference voltage $U_M$. The output of the window circuit 11 and the reset current amplifier circuit 9 are illustrated in FIGS. 5(h) and 5(i), respectively. The display indicator circuit 7 should therefore not remain on when the excessive current did not lead to actuation of the fuse or line protection device.

When the display indicator circuit 7 is excited by excessive current and has not been reset by operating current continuing to flow, counter circuit 6 will continue to count up until the set time has been reached, which is typically several hours. Then, the output Qn goes to high and the bistable flip-flop 5 is switched off via its reset input R2.

During the active time, the faulted circuit indicator can be retriggered by excessive current recurring. When reference voltage $U_M$ exceeds the threshold of comparator KOMP1, its output is switched from low to high. During this time the already active output $\bar{Q}$ of flip-flop 5 is low and therefore capacitor C3 is low via resistor R8. The positive edge of comparator KOMP1 sends a short positive voltage pulse to the high active reset input R of counter circuit 6 via capacitor C3 wired as a differentiator element. This deletes the counter status and sets all its outputs to low.

If the bistable flip-flop IC5 was still active at this time, it is reset via reset input $\bar{R}$ by the negative edge of output Qa of counter circuit 6. After expiration of the short time constant formed by RC network R8 and C3, the reset input R of counter 6 goes to low and the counter circuit is restarted. The low active set input of flip-flop IC5 is triggered by the negative edge of differentiating network R8 and C3 causing output Q of this stage to go to high.

The variable load levelling circuit 2 was not included in the previous function description, because the lowest operating current of interest was assumed. If the line continuously carries a higher operating current, the unit automatically adapts itself to this load to the aid of the variable load levelling circuit 2.

If the faulted circuit indicator 110 is connected to a conductor, whose average operating current is 150 A, for example, a higher reference voltage $U_M$ is formed. This pulsating DC voltage slowly charges a capacitor C1 via a resistor R1, which is connected in series to a voltage limiting Zener diode D3. The charging current is limited by resistor R3. A diode D1 is provided to prevent capacitor C1 from discharging through resistor R1 during the time between the peaks of successive half-waves. A significantly larger resistor R2 is connected at the junction between the diode D1 and the resistor R3 so that the desired discharge of capacitor C1 via the resistors R3 and R2 is maintained. The charging voltage on the capacitor C1 is present at the gate of a field-effect transistor T1, whose conduction path resistance depends on the voltage present between the source/drain and gate.

The transistor T1 together with its associated components acts as a variable load for the current sensor formed by coil L1 and rectifier BG1. While reducing the level of the reference voltage $U_M$, the transistor T1 conducts just enough current so that the charging current over resistor R3 to capacitor C1 is in balance with the discharge via the resistors R3 and R2. In principle, the variable load levelling circuit 2 is a parallel regulator with extremely sluggish control characteristics. The variable load levelling circuit adapts itself continuously to the operating current, although it is extremely slow thereby forming an average value.

A high overcurrent or short circuit current superimposed on the operating current level rapidly increases the amplitude of the reference voltage UM causing the time/current trigger circuit 3 to trip. The variable load levelling circuit 2 is dimensioned to achieve a fixed ratio between the operating current and the excitation current defined according to the time/current curve. The threshold value is therefore n-times the operating current. In this case another shifted curve b, c, etc. is used instead of time/current curve a of FIG. 4. The curve can be adapted approximately to the curve for the protective device or the characteristics of the circuit breaker by changing the dimensioning of the components. The threshold characteristics for the variable load levelling circuit are selected so that the reference voltage $U_M$ with maximum limitation as continuous value does not trip the time/current trigger circuit 3.

Continuous adaptation of the load resistance to the average operating current ensures that the core material of the current transducer becomes saturated only at extremely high currents due to the continuous current load.

The long time constant of the variable load levelling circuit 2 also has the advantage that the operating current value remains stored for up to 24 hours when the line is switched off and therefore is not excited when power returns.

For test purposes, the faulted circuit indicator 110 can be magnetically excited manually via a reed contact RK1. This contact connects the battery 12 with resistor R9 so that a voltage pulse is present at the set input S2 of the bistable flip-flop IC1. All time functions start upon activation. A second reed contact RK2 allows the flip-flop 5 to be reset via reset input R1 in combination with a resistor R11 so that the faulted circuit indicator 110 can be returned to the monitoring state.

Figure 3:
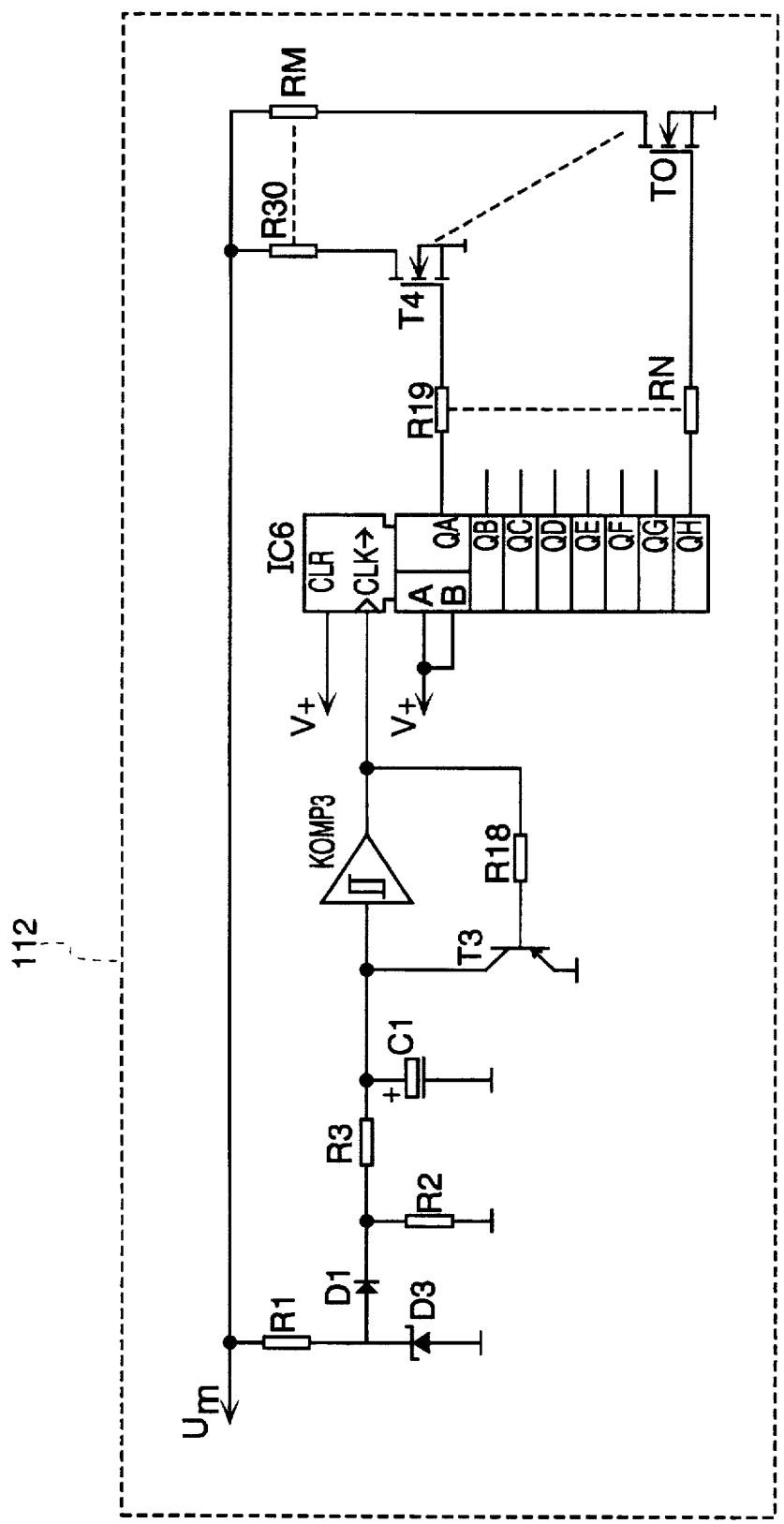
FIG. 3 is a schematic circuit diagram of a second embodiment of the variable load levelling circuit of FIG. 2.

FIG. 3 shows a schematic circuit diagram of a second embodiment of a variable load 112. The circuit elements of resistors R1, R2, R3, diodes D1, D3 and capacitor C1 are the same as in FIG. 2. A comparator KOMP3 and transistor T3 are connected to the capacitor C1.

The base of the transistor T3 is connected to the comparator output via resistor R18. If the charging voltage on capacitor C1 exceeds the switching threshold of the comparator, its output switches from low to high potential. This causes a base current to flow through the transistor T3 via the resistor R18. This transistor T3 becomes conductive so as to discharge the voltage on the capacitor C1 down to below the hysteresis voltage.

The output of the comparator is connected to a digital memory IC6, such as a shift register similar to TC74HC164P/F sold by Toshiba, whose outputs QA–QH are connected to respective resistors R19 through RN. These resistors are connected to the bases of corresponding field-effect transistors T4 through T0, assigned to associated load resistors R30 to RM. The field-effect transistors T4–T0 operate as pure switches in contrast to the variable resistance of transistor T1 in FIG. 2.

On new faulted circuit indicators, the digital memory IC6 is reset at the factory. All outputs QA–QH are at a low potential and the connected field-effect transistors T4–T0 are rendered non-conductive. When this faulted current indicator is positioned on a busbar or cable, whose current load is so low that capacitor C1 does not achieve the threshold voltage of comparator KOMP3, the digital memory remains reset. If the current increases permanently to above the first limit, the comparator KOMP3 switches to a high level. It sends a switching pulse to the digital memory. Its logical level increases from low to high at its output QA. The transistor T4 is switched to be continuously conductive via the resistor R19, whereby resistor R30 forms a permanent load for the sensor 1.

In other words, the reference voltage $U_M$ is reduced permanently by connecting the load resistor R30. The overcurrent indicator has therefore set itself to the first digital stage. The load setting remains stored permanently as the peak value until a new, higher limit exceeds this load permanently. A new trigger pulse from the comparator then activates a second memory output QB, so that transistor T5 is switched on via the resistor R20, and the load resistor R31 is also used as an additional permanent load.

After each trigger pulse this operation is repeated at a higher memory output (i.e., QC, QD, . . . QH), whereby in each case the capacitor C1 is discharged to the point that comparator KOMP3 and therefore the transistor T3 again become non-conductive. The charging and load change cycle is continued until a load resistance to match the operating current is activated. The faulted circuit indicator then operates at the maximum current occurring in the monitored line on the long-term. It is therefore optimally adapted to the line power. Short-term excessive currents or short circuit currents do change the load setting. They are included completely in the time/current curve for the faulted circuit indicator and therefore lead to a short circuit indication.

The faulted circuit indicator of the present invention has the following advantages over the prior art:

1. All imaginable operating current ranges can be covered with one single variable load levelling circuit according to FIG. 2 or 3 without adaptation measures or reconnection work.

2. Short circuits are sensed with certainty and indicated permanently.

3. Transitory excessive current such as transformer magnetizing inrush current or switch-on surges normally do not lead to excitation, because they are covered by the curve which is close to the curve for the protective devices.

If the faulted circuit indicator is tripped, nonetheless, it is reset after a few seconds, when the fuse was not actuated and normal operating current continuous to flow. This also applies when the line is switched to a heavy load for the first time and the excitation level of the unit, which is still set to the lowest value, is exceeded. The unit resets within the reset window. Within this time adaptation to the load is also accomplished.

The current reset is therefore activated for only a few seconds to prevent the faulted circuit indicator tripped by short circuit from resetting in an uncontrolled manner when the power returns or through influence of adjacent fields.

4. If the short term excessive current indication is found to be a bother, switch-on of the display indicator circuit can be suppressed or held back with the aid of the counter until the window for current resetting is closed. In this case only the final result of the measurement is displayed.

5. The faulted circuit indicator is reset after expiration of the display time. If excessive current occurs again during this period the counter is reset and the expiration time restarted.

6. Alternatively, the current reset window circuit can be changed so that the faulted circuit indicator is always reset when the power returns or is still present. In this case the resetting operation is not limited to the window time frame. It is accomplished a few seconds after triggering in order to allow the excitation event to decay.

7. A further advantage for resetting may be whether the electrical field accompanying the line power is maintained or collapses. The field can be checked in a window or continuously during the activated period.

From the foregoing detailed description, it can thus be seen that the present invention provides an improved faulted circuit indicator for sensing and for registering a fault in response to an overcurrent in a cable in a power distribution system network. The faulted circuit indicator includes a variable load levelling circuit which can automatically adjust itself to different peak loads. The variable load levelling circuit regulates a variable output voltage from the current sensing circuit to be at a constant reference value in order to accommodate a relatively wide range of load currents.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A faulted circuit indicator for sensing and for registering a fault in response to an overcurrent in a cable in a power distribution network, comprising:

current sensing means for monitoring a varying load current flowing through the cable and for generating on its output a variable output voltage which is proportional to the varied load current flowing through the cable;

overcurrent detecting means responsive to said current sensing means for detecting an overcurrent condition;

control means responsive to said current sensing means and to said overcurrent detecting means for evaluating the current flowing through the cable during a predetermined time interval subsequent to the time when the overcurrent condition is detected;

indicator means responsive to said control means for generating a fault registration only when the current evaluated during the predetermined time interval has an amplitude below a pre-selected level so as to indicate that an actual fault has occurred as a result of the overcurrent condition rather than a transient event;

variable load leveling means operatively connected in parallel to said current sensing means and being responsive to said varied load current for regulating said variable output voltage therefrom to be at a constant reference value and for storing a value of said variable output voltage corresponding to a predetermined load current so as to automatically adjust to different peak loads in order to accommodate a relatively wide range of load currents;

said variable loading means being formed of a first resistor, a first voltage limiting Zener diode, a second diode, a second resistor, a third resistor, a capacitor and a field-effect transistor having a gate, a drain, and a source; and said first resistor having its one end connected to the output of said current sensing means and its other end connected to the cathode of the first diode and to the anode of the second diode, the cathode of the second diode being connected to one end of the second resistor and to one end of the third resistor, said capacitor having its one end connected to the second end of the third resistor and to the gate of the field-effect transistor, said capacitor having its other end connected to the anode of the first diode, the other end of the second resistor and the source of the field-effect transistor, said field-effect transistor having its drain connected to the one end of the first resistor.

2. A faulted circuit indicator as claimed in claim 1, wherein said current sensing means includes a coil inductively coupled to the cable and a bridge rectifier coupled to said coil for producing said variable output voltage.

3. A faulted circuit indicator as claimed in claim 2, wherein said overcurrent detecting means includes time/current triggering means for generating a trip signal when the load current exceeds a predetermined amount indicative of the overcurrent condition.

4. A faulted circuit indicator as claimed in claim 3, wherein said time/current triggering means is comprised of comparator means for comparing said variable output voltage with a threshold voltage and for generating a voltage proportional to said trip signal when the proportional voltage exceeds the threshold voltage.

5. A faulted circuit indicator as claimed in claim 4, wherein said control means further includes memory means responsive to said trip signal for storing information representative of the overvoltage condition and oscillator-driven counter means responsive to said stored information for starting the predetermined time interval and for generating first and second control signals.

6. A faulted circuit indicator as claimed in claim 5, wherein said indicator means is responsive to said first control signal for illuminating a visible signalling device.

7. A faulted circuit indicator as claimed in claim 6, wherein said control means further includes reset current amplifier means responsive to said current sensing means for generating a reset logic signal when the current is above the pre-selected level.

8. A faulted circuit indicator as claimed in claim 7, wherein said control means further includes a current reset window means responsive to said stored information in said memory means, said second control signal in said counter means, and said reset logic signal from said amplifier means for determining the predetermined time interval in which the current is evaluated to determine if its amplitude is below the pre-selected level and for generating a reset signal to said memory means for causing said indicator means to be switched off when the amplitude of the current evaluated during said time interval is above the pre-selected level.

9. A faulted circuit indicator as claimed in claim 8, wherein said reset signal is not generated when the current in the time interval is below the pre-selected level so as to cause the first control signal from said counter means to illuminate said visible signalling device.

10. A faulted circuit indicator for sensing and for registering a fault in response to an overcurrent in a cable in a power distribution network, comprising:

means for detecting an overcurrent condition in the cable;

means for evaluating a variable load current during a predetermined time interval following the overcurrent condition;

means for registering a fault condition when the variable load current is evaluated to be below a pre-selected level;

variable load levelling means responsive to said variable load current for regulating an output voltage to be at a constant reference value so as to automatically adjust to different peak loads in order to accommodate a relatively wide range of load currents;

said variable load leveling means being formed of a first resistor, a first voltage limiting Zener diode, a second diode, a second resistor, a third resistor, a capacitor and comparator means;

said comparator means including a comparator having an input and an output, a fourth resistor, and a bipolar transistor having a base, collector and emitter;

said first resistor having its one end connected to said detecting means and its other end connected to the cathode of the first diode and to the anode of the second diode, the cathode of the second diode being connected to one end of the second resistor and to one end of the third resistor, said capacitor having its one end connected to the second end of the third resistor and to the input of the comparator, said capacitor having its other end connected to the anode of the first diode, the other end of the second resistor and the emitter of the bipolar transistor, said bipolar transistor having its collector connected to the input of the comparator, said fourth resistor having its one end connected to the base of said bipolar transistor and its other end connected to the output of said comparator;

said variable load leveling means further including shift register means having its input connected to the output of said comparator, a plurality of load resistors, a plurality of switching transistors, and a plurality of gate resistors, said plurality of switching transistors being interconnected between corresponding outputs of said shift register means and corresponding ones of said plurality of load resistors to permanently store one or more of said plurality of load resistors in parallel with said detecting means, said plurality of gate resistors being interconnected between said corresponding outputs of said shift register means and a corresponding gate of said plurality of switching transistors.

11. A faulted circuit indicator as claimed in claim 10, wherein said overcurrent detecting means includes time/current triggering means for generating a trip signal when the load current exceeds a predetermined amount indicative of the overcurrent condition.

12. A faulted circuit indicator as claimed in claim 11, wherein said time/current triggering means is comprised of comparator means for comparing said variable output voltage with a threshold voltage and for generating a voltage proportional to said trip signal when the proportional voltage exceeds the threshold voltage.

13. A method for sensing and for registering a fault in response to an overcurrent in a cable in a power distribution network, said method comprising the steps of:

detecting an overcurrent condition in the cable;

evaluating a variable load current during a predetermined time interval following the overcurrent condition;

registering a fault condition when the variable load current is evaluated to be below a pre-selected level;

regulating an output voltage representative of the variable load current to be at a constant value so as to automatically adjust to different peak loads in order to accommodate a relatively wide range of load currents; and connecting a variable load in parallel with the current which is being detected in the cable.

14. A faulted circuit indicator for sensing and for registering a fault in response to an overcurrent in a cable in a power distribution network, comprising:

current sensing means for monitoring a varying load current flowing through the cable and for generating on its output a variable output voltage which is proportional to the varied load current flowing through the cable;

overcurrent detecting means responsive to said current sensing means for detecting an overcurrent condition;

means responsive to said overcurrent detecting means for generating a fault registration when a fault has occurred as a result of the overcurrent condition;

variable load leveling means operatively connected in parallel to said current sensing means and being responsive to said varied load current for regulating said variable output voltage therefrom to be at a constant reference value and for storing a value of said variable output voltage corresponding to a predetermined load current so as to automatically adjust to different peak loads in order to accommodate a relatively wide range of load currents;

said variable loading means being formed of a first resistor, a first voltage limiting Zener diode, a second diode, a second resistor, a third resistor, a capacitor and a field-effect transistor having a gate, a drain, and a source; and said first resistor having its one end connected to the output of said current sensing means and its other end connected to the cathode of the first diode and to the anode of the second diode, the cathode of the second diode being connected to one end of the second resistor and to one end of the third resistor, said capacitor having its one end connected to the second end of the third resistor and to the rate of the field-effect transistor, said capacitor having its other end connected to the anode of the first diode, the other end of the second resistor and the source of the field-effect transistor, said field-effect transistor having its drain connected to the one end of the first resistor.

* * * * *